Dec. 14, 1943.  H. C. BREST  2,336,775
APPARATUS FOR USE IN PREPARING PLANT PRODUCTS FOR MARKET
Filed Dec. 27, 1941  10 Sheets-Sheet 1
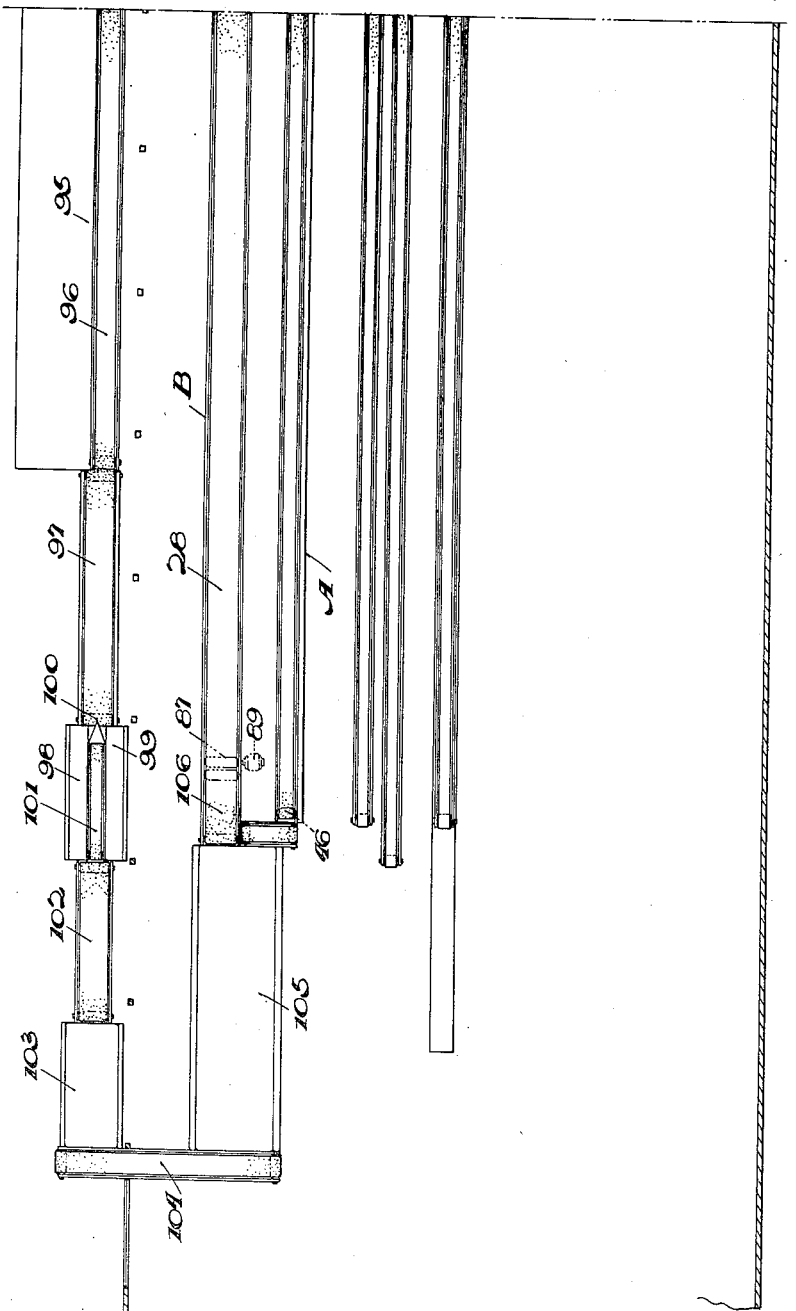
Inventor
Harry C. Brest.
By Roy F. Stewart
his Attorney

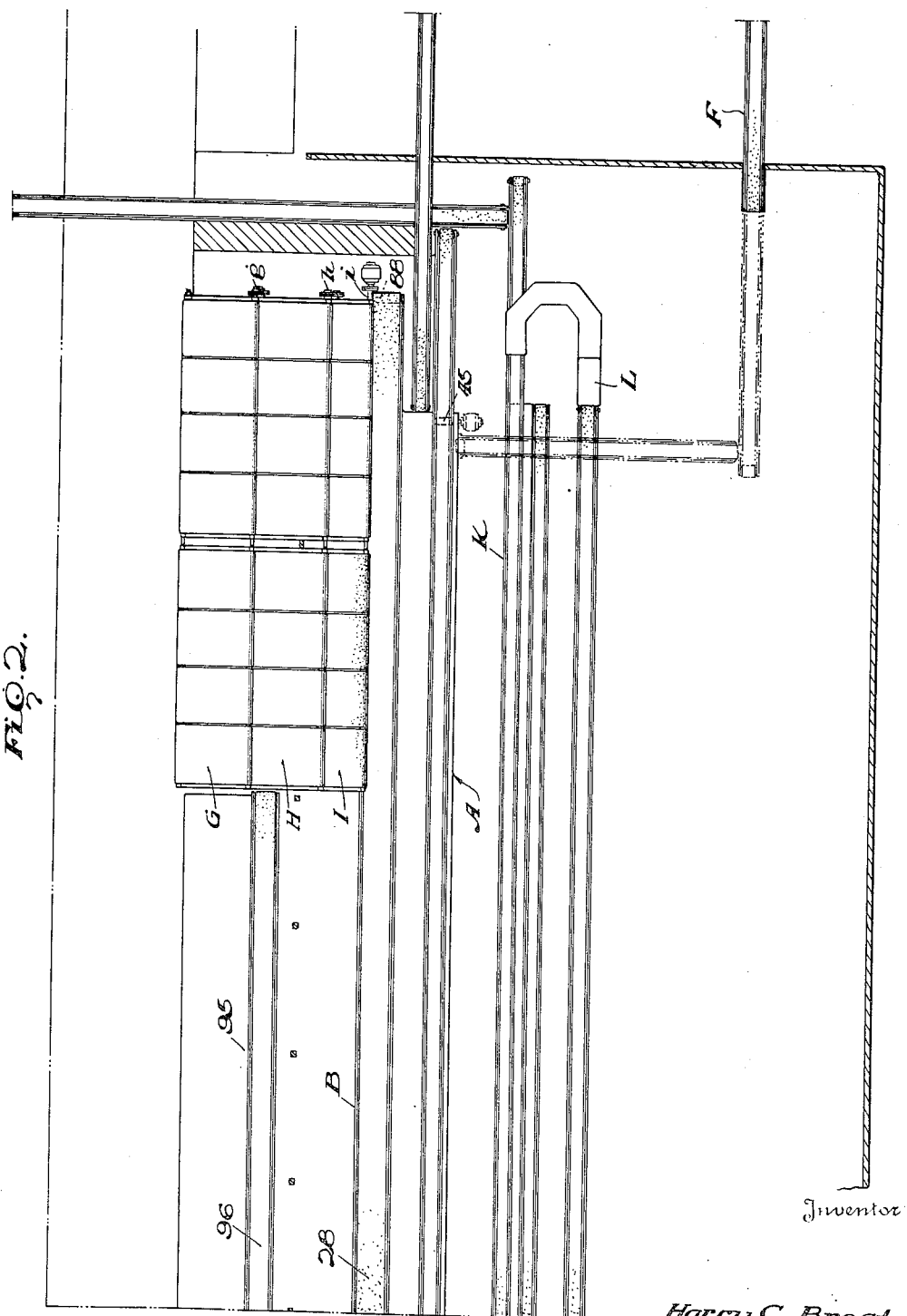

Dec. 14, 1943.   H. C. BREST   2,336,775
APPARATUS FOR USE IN PREPARING PLANT PRODUCTS FOR MARKET
Filed Dec. 27, 1941   10 Sheets-Sheet 3
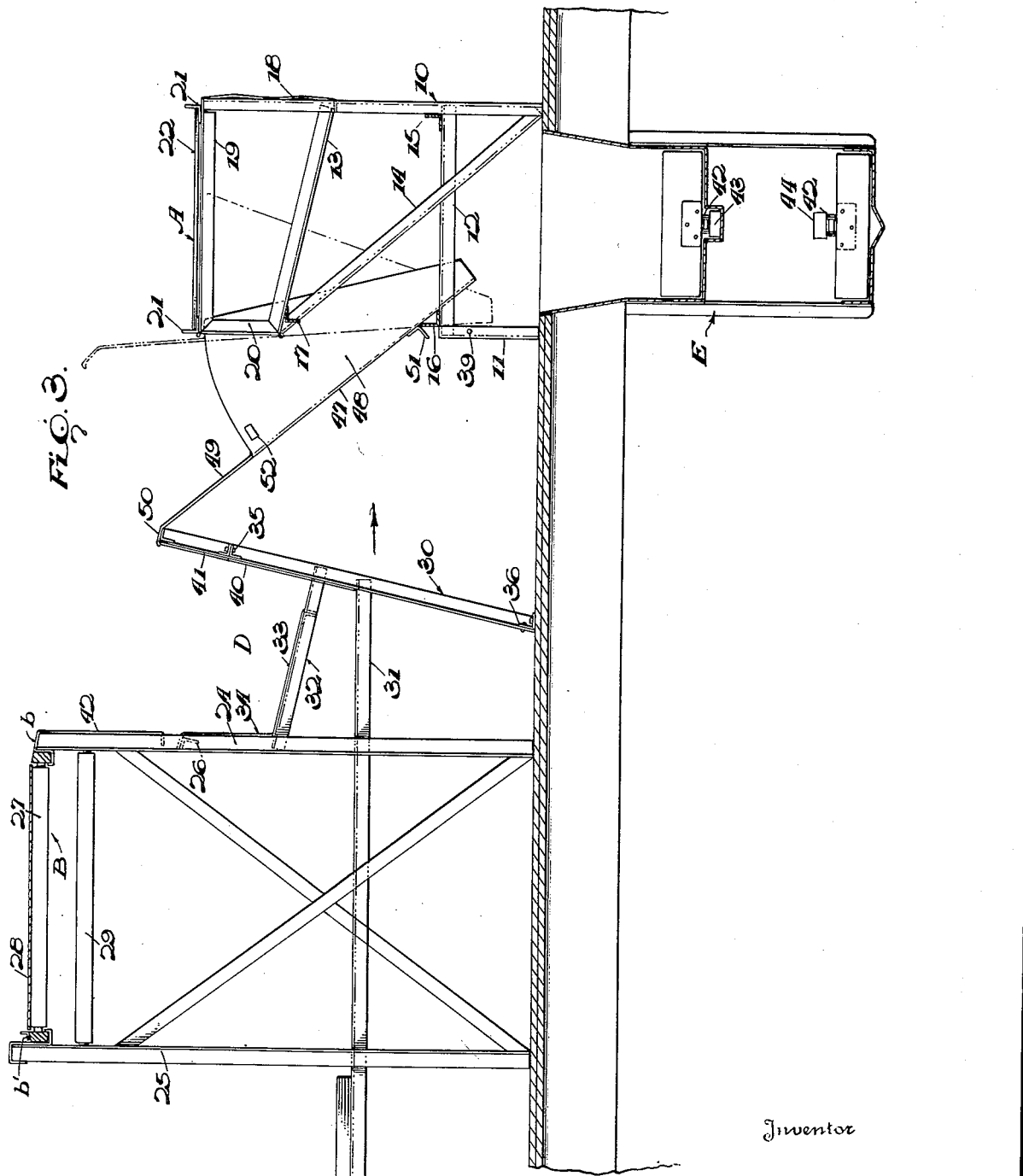
Inventor
Harry C. Brest.
By Roy F. Steward,
his Attorney

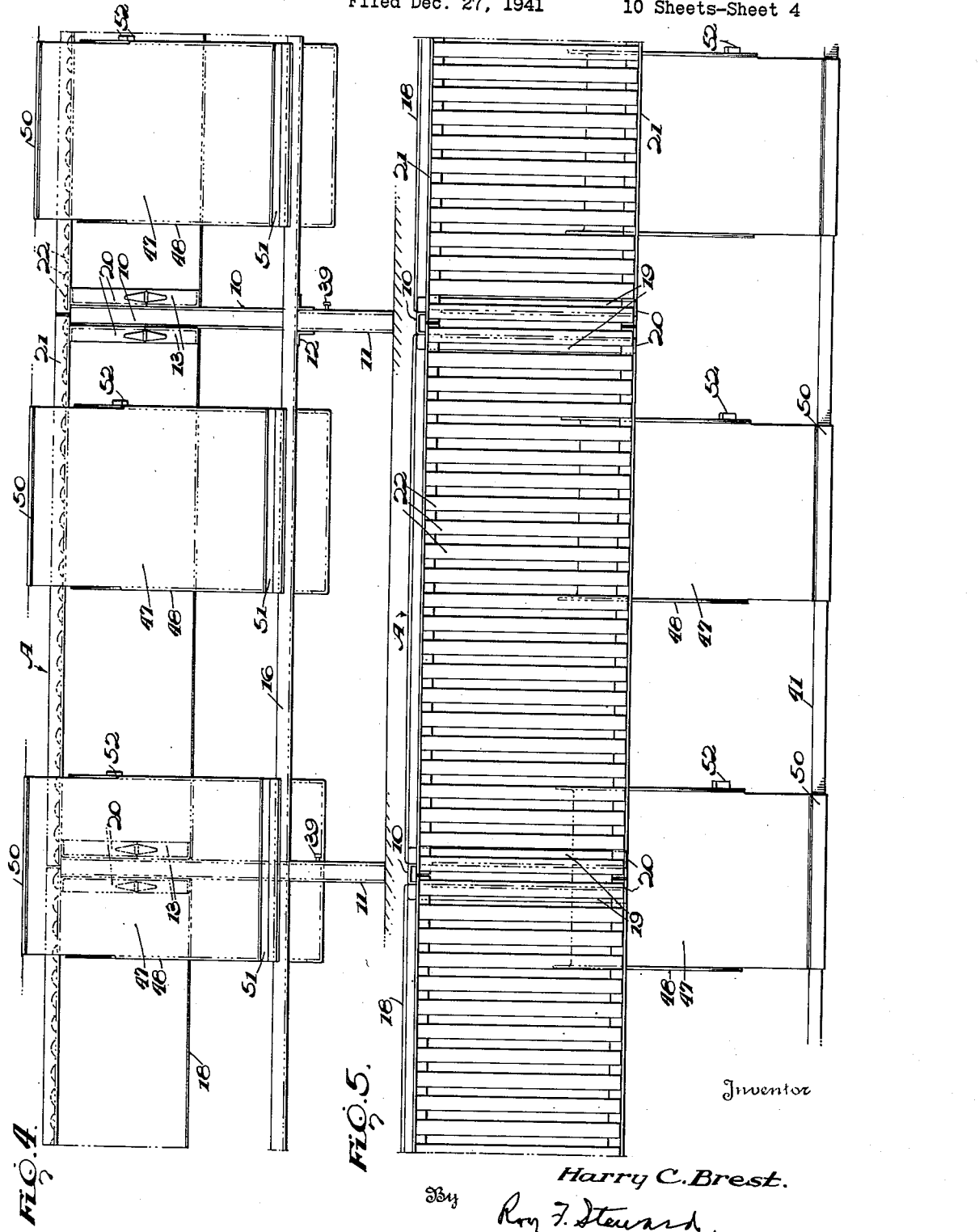

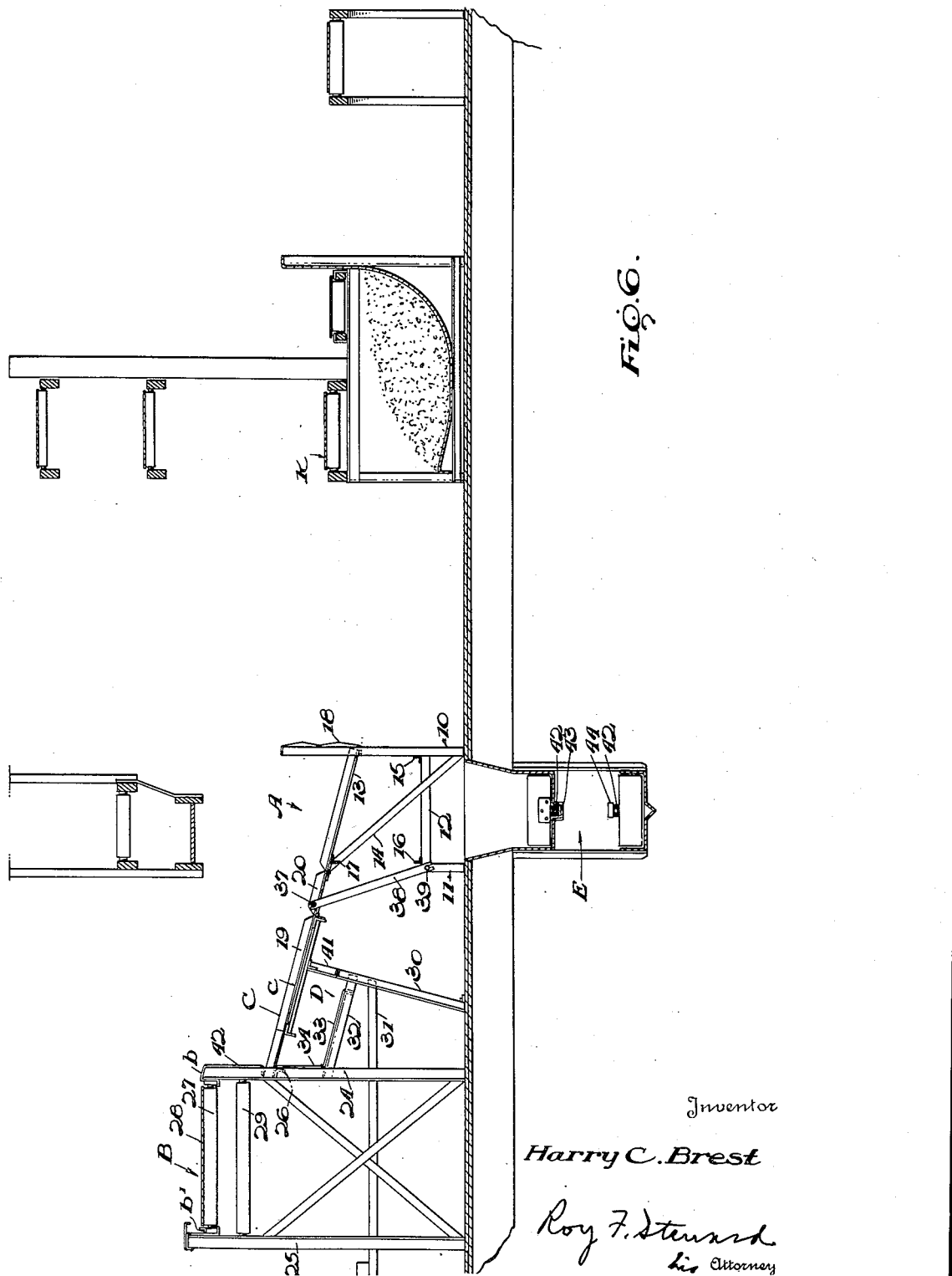

Dec. 14, 1943.   H. C. BREST   2,336,775
APPARATUS FOR USE IN PREPARING PLANT PRODUCTS FOR MARKET
Filed Dec. 27, 1941   10 Sheets-Sheet 6
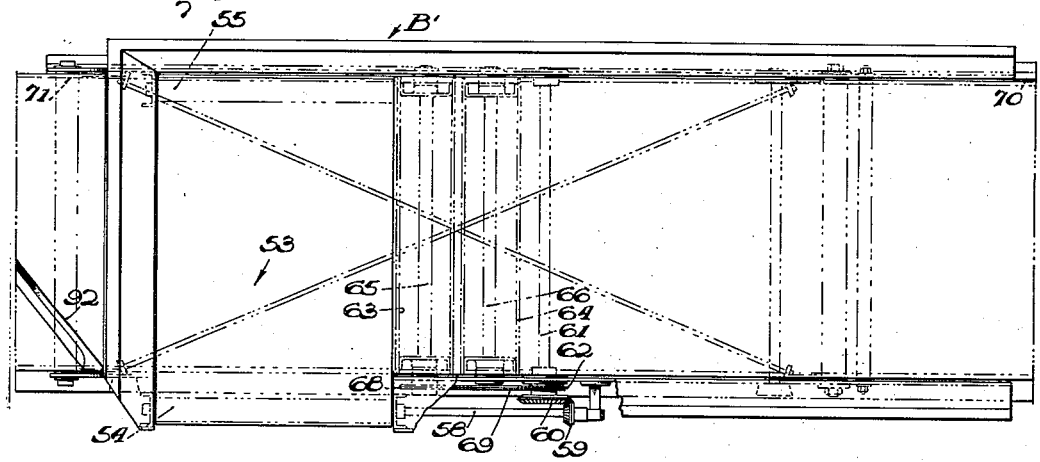
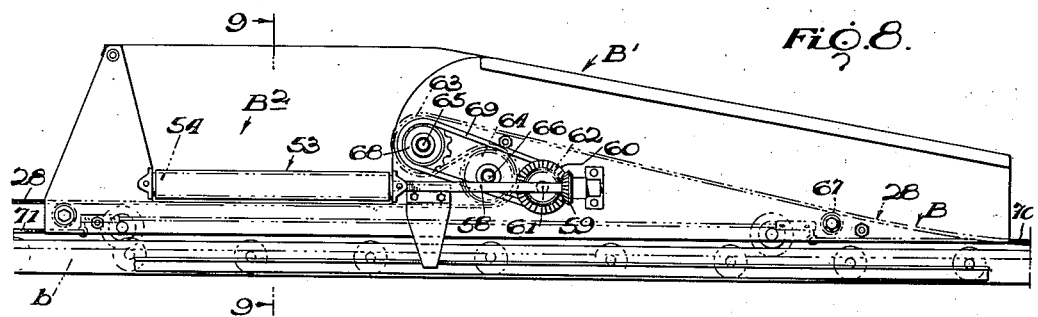
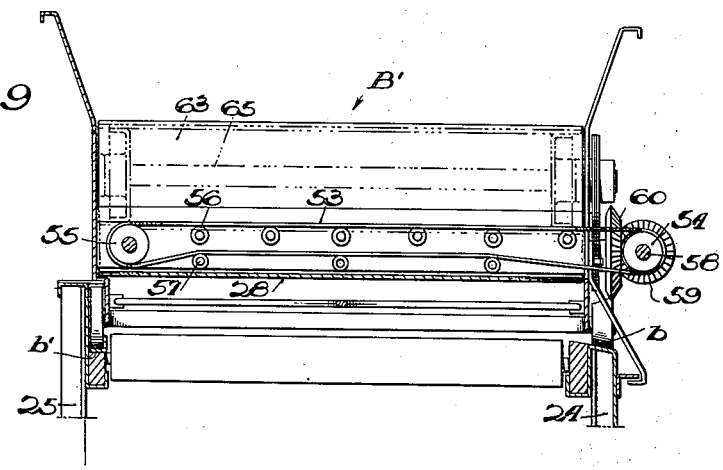
Inventor
Harry C. Brest
By Roy F. Steward
his Attorney Dec. 14, 1943. H. C. BREST 2,336,775
APPARATUS FOR USE IN PREPARING PLANT PRODUCTS FOR MARKET
Filed Dec. 27, 1941 10 Sheets-Sheet 7
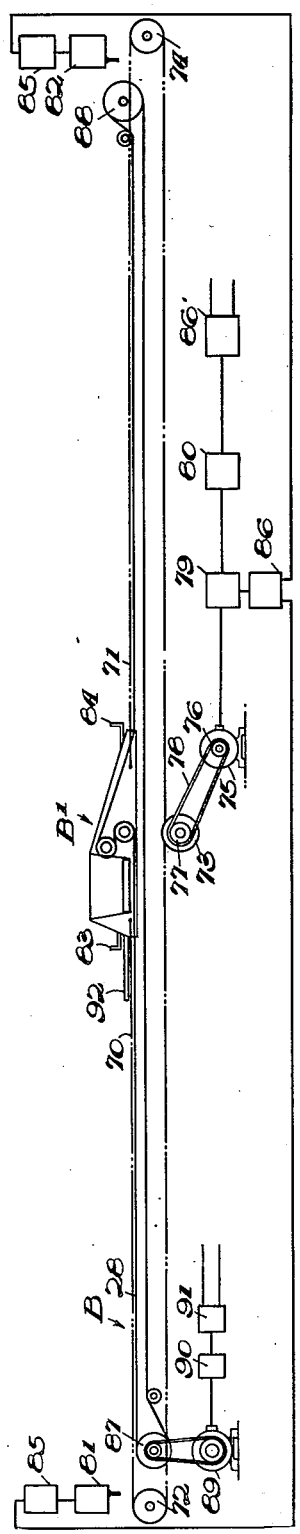
Inventor
Harry C. Brest.
By Roy F. Steward
his Attorney

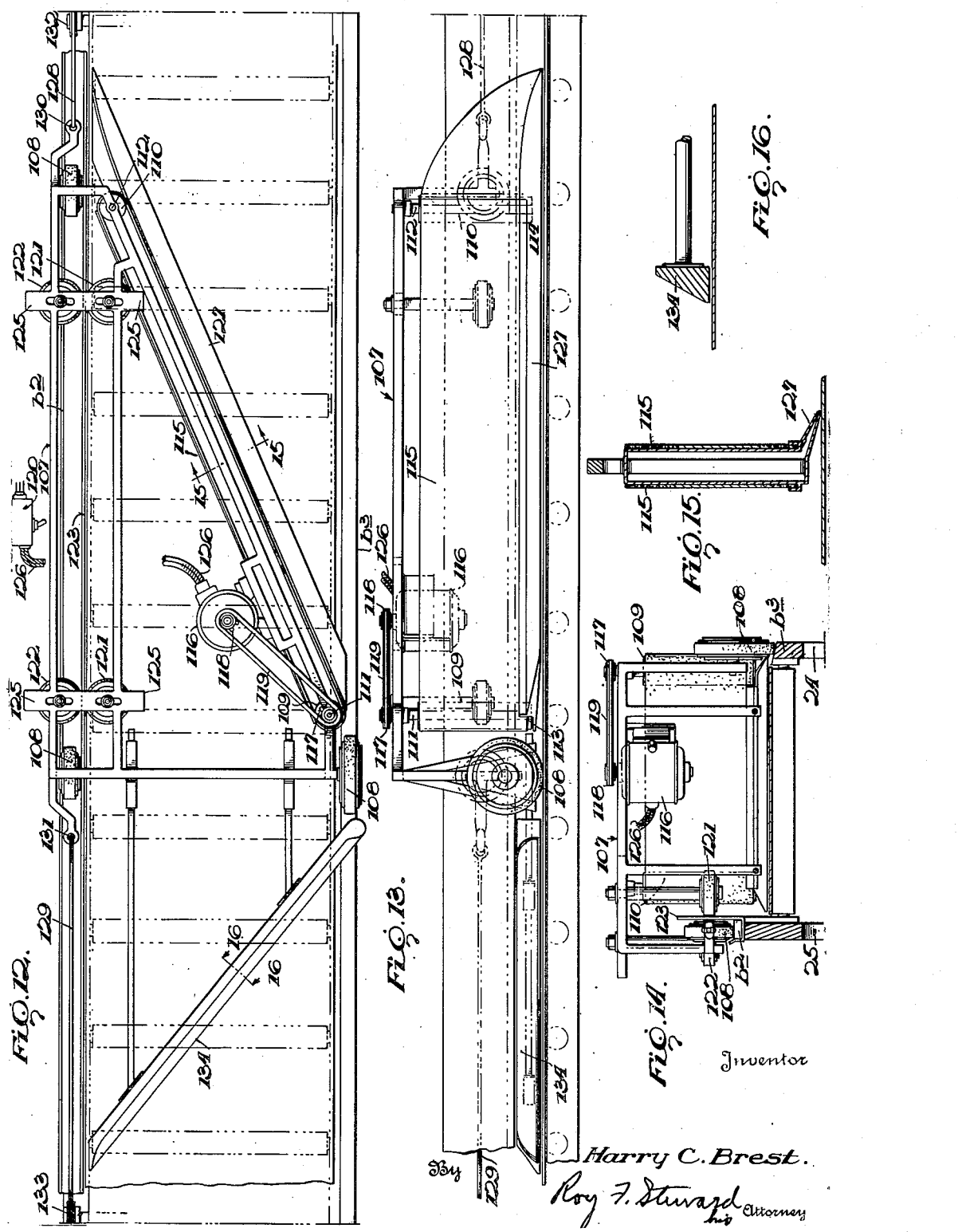

Dec. 14, 1943.   H. C. BREST   2,336,775
APPARATUS FOR USE IN PREPARING PLANT PRODUCTS FOR MARKET
Filed Dec. 27, 1941   10 Sheets-Sheet 9
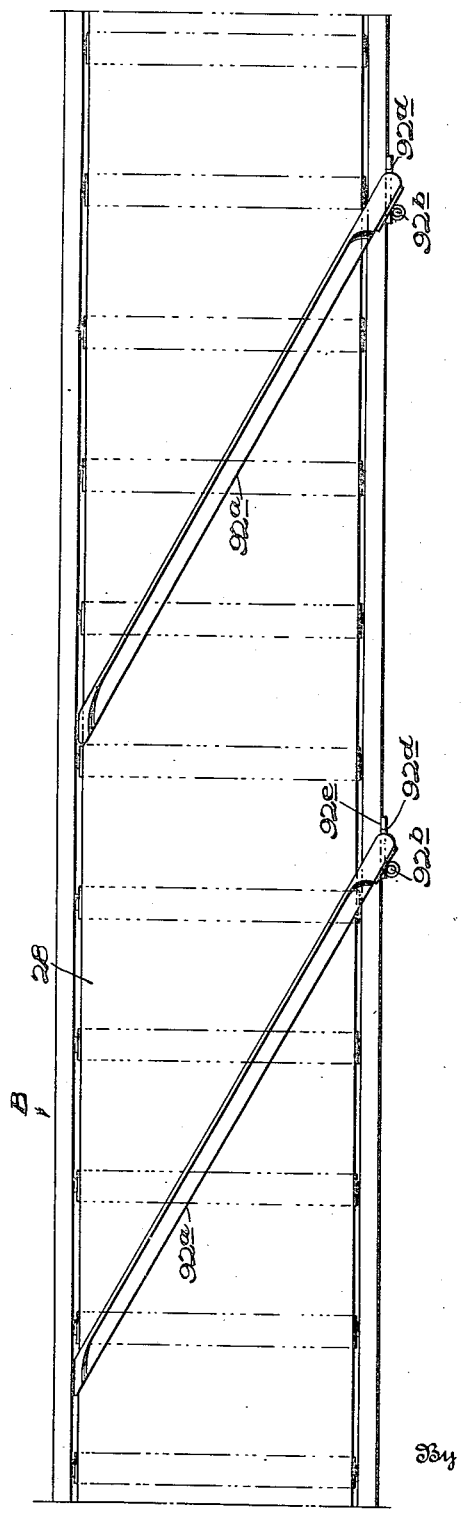
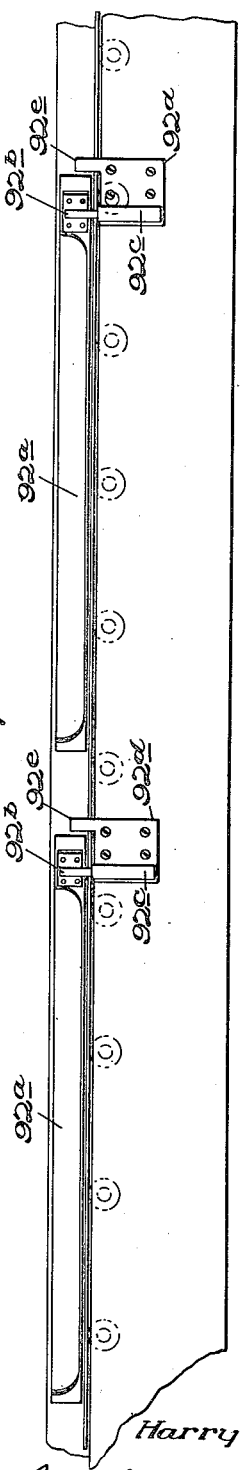
Inventor
Harry C. Brest.
By
Roy F. Steward, his Attorney Dec. 14, 1943.   H. C. BREST   2,336,775
APPARATUS FOR USE IN PREPARING PLANT PRODUCTS FOR MARKET
Filed Dec. 27, 1941   10 Sheets-Sheet 10

Inventor
Harry C. Brest
By Roy F. Steward
his Attorney

Patented Dec. 14, 1943

2,336,775

UNITED STATES PATENT OFFICE 2,336,775

APPARATUS FOR USE IN PREPARING PLANT PRODUCTS FOR MARKET

Harry Clinton Brest, Pomona, Calif., assignor to Brogdex Company, a corporation of California Application December 27, 1941, Serial No. 424,672

9 Claims. (Cl. 198—19)

This invention relates to an apparatus for use in preparing plant products for market.

It has been common in packing houses to provide apparatus for use in preparing, grading and packing for market a certain type or kind of plant product, for example, lettuce. This apparatus was operated during the season for harvesting and marketing such plant product, but when the season was over said apparatus was idle until the next season. In some packing houses, it has been common to dismantle the said apparatus and install another apparatus for operating on a different kind of plant product which matures and comes onto the market at a date later than said first mentioned plant product. As an illustration of the two kinds of plant products which are handled seriatim in some packing houses, lettuce and cantaloupes may be mentioned.

The treatment of lettuce in preparing it for market is so different from the treatment of cantaloupes in preparing them for market that a large part of the apparatus heretofore used in preparing lettuce is not suitable for use in preparing cantaloupes, and vice versa.

It is obvious that to dismantle and move an extensive lettuce handling apparatus, or a large part thereof, and replace it with an extensive cantaloupe handling apparatus, in a packing house, and thereafter to dismantle and remove the cantaloupe apparatus and restore the lettuce apparatus ready for the next season, involves considerable expense for labor, often amounting to as much as $2000, which of course, must be included in the cost of doing business. In addition, however, there must be a charge to cover the cost of storage and interest on the investment for each type of apparatus, and as each is idle for a considerable part of the year, because of the seasonal nature of its use, the cost of marketing the two types of plant products is enhanced to a considerable extent.

An important object of the present invention is to avoid the disadvantages hereinbefore pointed out and thereby materially reduce the cost of marketing each plant product handled in a packing house provided with applicant's apparatus.

With this general object in view and some others which will be obvious to those skilled in the art from the description hereinafter, the invention consists in an apparatus which, by a slight alteration of parts, may be used for preparing, grading and packing either of at least two kinds of plant products, more particularly lettuce and cantaloupes, thereby providing a compact practically permanent installation, ready to handle either plant product by a slight and relatively quickly made alteration, the construction being such that a large part of the apparatus functions for handling both kinds of plant product, thereby cutting down appreciably the cost of the original investment, not only reducing the charge for interest on the investment, but, because of the longer use of such conjointly functioning apparatus, reducing the pro rata cost of handling each product. Furthermore, the expense for dismantling, removing, storing and replacing an apparatus as hereinbefore referred to, is entirely avoided.

An apparatus embodying the invention will be described in connection with the accompanying drawings which illustrate an apparatus suitable for use in preparing, grading and packing for market lettuce and similar products, such as cabbage and cauliflower, and also melons or similar products, including cantaloupes.

In the drawings,

Figs. 1 and 2, together, constitute a diagrammatic plan view or layout of an apparatus embodying applicant's invention particularly suitable for use in preparing, grading and packaging two kinds of plant products such as lettuce and cantaloupes;

Fig. 3 is a transverse vertical view showing the end of a convertible table embodying certain features of the invention, the table being shown in its closed condition for use as a work table when packaging lettuce or the like. In this view a cull-conveyor is indicated beneath the table, and a cull chute is shown supported at its top by the upper portion of the front wall of the small bin and at its lower end by a longitudinal member of the table;

Fig. 4 is an elevation of one table, and adjacent parts of adjoining tables, of the type shown in Fig. 3, looking in the direction of the arrow, Fig. 3.

Fig. 5 is a plan view of the parts shown in Fig. 4.

Fig. 6 is a diagrammatic transverse sectional view of the table illustrated in Figs. 3, 4 and 5, in its extended position, the top and its connected parts being supported in part on the lower section of the front wall of the small bin, the removable bottom of the large bin being shown with its outer end supported on the frame of the main conveyor, indicated in transverse vertical section. Also in this view the location of the ice bin, the ice conveyor, the empty crate conveyor, and the conveyor for carrying off the packaged products are indicated in transverse section. Furthermore the cull conveyor is shown below the level of the floor.

Fig. 7 is a plan view;

Fig. 8 a longitudinal section, and

Fig. 9 a transverse vertical section respectively of one form of unloading device embodying features of applicant's invention.

Fig. 10 is a diagrammatic side view illustrating the means for causing the unloading device to travel longitudinally of the main conveyor in both directions;

Fig. 11 is a detail plan view illustrating the winding drum and cables of the apparatus shown in Fig. 10;

Fig. 12 is a plan view;

Fig. 13 is a longitudinal side elevation, and

Figs. 14, 15 and 16 detail views of another form of unloading device or distributor embodying certain features of the invention;

Fig. 17 is a plan view, and

Figure 19:
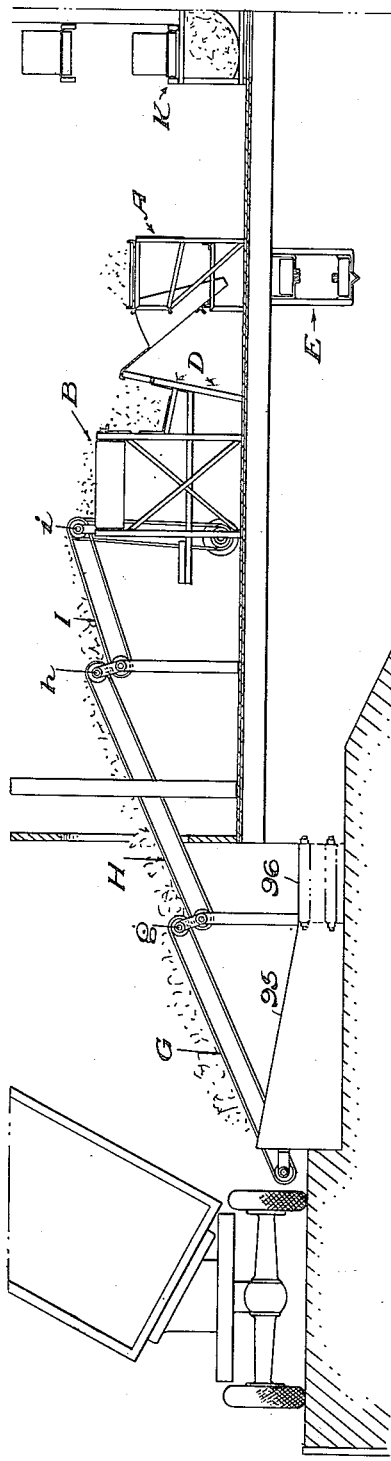

Fig. 18 a side elevation illustrating a detachable sheer board for use with the main conveyor;

Fig. 19 is a diagrammatic side elevation; and

Figure 20:
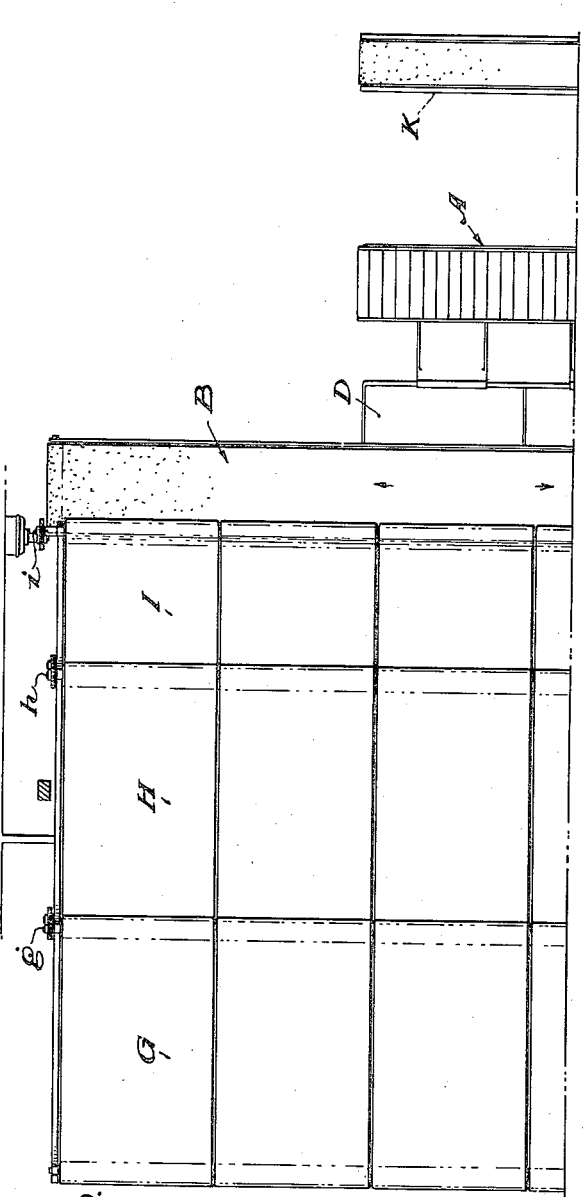

Fig. 20 is a plan view of a distributing and elevating apparatus for handling products such as lettuce, and delivering the same in properly distributed condition onto the end of the main conveyor.

Before describing the layout of the entire apparatus as indicated in Figs. 1 and 2, it will be best to explain some details of construction and arrangement of the work tables, the bins, the offal conveyor, and chutes, and the main conveyor for bringing up the products to the bins, because of the structural interrelations of these parts.

Referring first to Fig. 3, A indicates generally a work table of suitable dimensions, usually about 36 inches high and 24 inches wide, the length being proportional to the number of operatives to be accommodated. While the dimensions are not controlling in and of themselves, there is a relation between certain dimensions of the table and of other parts of the apparatus and of the distances separating the table and the bins which have an important bearing on the functions of the parts, as will be clear from the description hereinafter.

The table has legs of any suitable kind, wood or iron, but in every case the legs 10 at the right hand side in Fig. 3 must be longer than the legs 11 at the left hand side, for a purpose which will be apparent from the description hereinafter.

The legs 10 and 11 are tied to each other in the direction of the width of the table by cross-braces 12 and 13, the latter brace being at a particular slope for a purpose hereinafter explained. Also the pair of legs 10 and 11 are braced by a diagonal strut 14 extending from the bottom of the longer leg 10 to about the top of the shorter leg 11 of the pair of legs. Each pair of legs 10 and 11 and the connecting members 12, 13 and 14 form what may be termed a table truss.

These table trusses are connected in a series, the number of which depends upon the size of the plant and the required length of the table, by means of longitudinal stringers 15, 16 and 17, and by longitudinal front plates 18 serving to close the spaces between the trusses at the upper part of the right side of the table, Fig. 3, above the braces 13, and to serve as the front of a large bin, as more fully explained hereinafter.

The table top is formed in sections, each of suitable length, usually about five feet, for convenience in handling it.

Each table top section indicated at 19 is movably joined, as by hinging, to a pair of vertical side sections 20, which side sections form a part of the side of the table at the left in Fig. 3. Each side section 20 is in turn movably joined, as by hinging, to the upper end of the corresponding cross-brace 13.

The top section 19 and the attached side sections 20 can be turned so as to provide a substantially level table top, as shown in Fig. 3, or turned outward into an extended position as shown in Fig. 6, the inner sides of the top section and the side sections lying in an inclined plane having about the same slope as that of the cross braces 13. The means for supporting the said side and top sections in their inclined extended positions will be explained hereinafter.

Each top section is made as a frame, for example, of angle iron consisting of longitudinal stiles or stringers 21 and the transverse rails 19, the stiles carrying a series of slats 22 which are spaced apart slightly and may have rounded upper edges, to form a grating on which lettuce or the like may be placed.

The side sections are merely supports and provide an open space through which offal may be thrown, to fall into an offal conveyor arranged beneath the table as more fully explained hereinafter.

Arranged parallel to the table is a main endless conveyor B which is mounted on suitable supports, indicated at 24 and 25. The supports 24, which are nearest the table, have a longitudinal tie member 26, whose upper face is inclined so as to lie about in the same inclined plane with the upper faces of the table top when extended, these upper faces being the under faces when the table sections are in closed position.

The main conveyor is constructed in the usual manner and has a series of upper rollers 27 to support the upper run of an endless conveyor belt 28, usually of rubber, canvas or other flexible material, while the under run of the belt is supported by lower rollers 29, such rollers being mounted in the usual bearings carried by the frame supporting the conveyor. The driving mechanism for the main conveyor is described hereinafter.

To that side of the conveyor which is nearest the table, a series of inclined posts 30 are fixed by means of suitable transverse members such as 31 and 32. The members 31 may be merely extensions of transverse braces forming part of the conveyor framework. The upper members 32 are inclined and serve as supports for a bin bottom of a bin hereinafter referred to as a small bin, this bottom being formed by longitudinal plates or sheets 33. Also the side of the conveyor frame from the upper members 32 to the tie member 26 is closed by a longitudinally extended wall 34 which may be of sheet metal bent over and secured to the upper face of tie member 26.

The inclined posts 30 are connected by a longitudinal member 35 and may have their lower ends held rigidly in any suitable way, as for example by securing such lower ends to the floor by angle plates 36. The longitudinal member 35 is advantageously of angle iron, and in any case has its upper surface sloped transversely and arranged in the inclined plane of the lower side of the extended top section 19, this being the upper side of said top section when it is not extended. Therefore, in the extended position of the top section and its conjoined side section 20, the top section rests on the upper face of said longitudinal member 35. To support the side section 20, it is provided with pins, one of which is indicated at 37, each of these pins resting in a slot in the upper end of a removable brace 38 whose lower end also is slotted to engage a pin 39, secured in the corresponding short leg of the table.

When the table top section and the conjoined side section are in their inclined extended position, they and the inclined braces 13, together with the inclined upper surface of the member 26 of the conveyor frame, form a support for removable floor panels, one of which is indicated in section c, which form the bottom of a bin C of large size suitable for receiving such plant products as cantaloupes, whereas, when the said floor panel is not in place, and the top section and side sections are in their closed, that is, non-extended position, access is given to the small bin D, suitable for receiving such a plant product as lettuce, in close proximity to the main conveyor B, and between the supports 24 of the conveyor and the inclined posts 30, which are provided, on the side toward the main conveyor, with a suitable front wall 40. Usually this will be of sheet metal. It will be well to extend the wall 40 somewhat below the bottom of the small bin, and to leave a small gap between said front wall 40 and the bottom 33 of the small bin, which bottom is supported on the inclined braces 32, as hereinbefore explained. This gap allows the bin to be cleaned easily and the extension of the front wall prevents the dirt from falling outside the bin into the space between the said small bin and the table, this space being intended for the use of the operatives, as more fully explained hereinafter.

In order to make the front wall of the small bin somewhat higher, it is provided with a movable section 41 secured to the upper end of the inclined posts in any suitable way. This front wall extension may be a series of sections, each section being a frame provided with a lining of sheet metal or other sheet material, and these sections may be either detachably connected to the lower portion of the front wall by bolts and nuts or may be hingedly connected thereto, so that they may be swung down out of the way when the top sections and conjoined side sections are to be extended, or may be turned up and fastened by bolts or catches when the table top sections and conjoined side sections are in their closed, or non-extended condition.

When the table top sections and their conjoined side sections are in what may be termed their closed positions, as indicated in Fig. 3, the table top is ready to perform its normal function as a table. At the same time, the small bin D, having the walls 34 and 40, and bottom 33, is in condition to receive a plant product, such as lettuce, which may be discharged into it laterally from the main conveyor, as will be more fully explained hereinafter.

Operatives, standing in the space between the front posts 30 of the small bin and the table legs 11, reach into the small bin, take the lettuce heads therefrom, one by one, trim off the outer loose leaves, which are thrown into the nearest adjacent offal chute hereinafter described, while the trimmed head is placed on the table top. Other operatives, standing at the said table on the side opposite the trimmers, take the trimmed heads from the table, pack them in crates brought up by suitable conveyors, also place some ice in the packed crate, and then deliver the crate to a crate conveyor which carries it to a box-nailing machine where the crate lid is nailed on. The finished crate then is removed by a conveyor which delivers it to a loading platform.

When, however, the apparatus is to be used for handling cantaloupes, the offal chutes are removed, as will be clear from the description hereinafter, the top portion 41 of the front wall of the small bin is turned down or removed so as to leave the upper edge of the lower portion of said wall free to receive and support the extended inclined top section and side section, on which is placed a panel c to form the bottom of the large bin C whose front is indicated at 18, Fig. 6, the bottom being the panel c and the back wall being indicated at 42, this being a sheet metal wall secured to the supports 24 of the conveyor frame. The panel c extends to and rests on the inclined surface of the member 35 of the main conveyor frame.

It will be seen that plant products such as cantaloupes may be conveyed to the large bin C by the main conveyor B, being discharged laterally from said conveyor into said large bin by suitable discharge mechanism, such as hereinafter explained.

From the large bin C, the cantaloupes are removed manually by the packers who place them in crates and send the crates to the box-nailing machine. It is to be noted that while lettuce heads are prepared by trimming after they have been delivered to the small bin D by the main conveyor, preparation of cantaloupes, if there be any, is done before the cantaloupes are placed on the main conveyor.

From the foregoing, it will be seen that the main conveyor is arranged to deliver either of two plant products to the respective bins. Where the two products are supplied to the main conveyor at one end only, the latter is arranged to travel in only one direction. For example, if the apparatus is arranged to treat lettuce, the lettuce heads are brought by suitable means, such as hereinafter described, from the place of delivery of the lettuce heads to one end, for example, the right hand end, Figs. 1 and 2, of the main conveyor belt, where they are properly distributed upon said belt, and then are carried toward the left, Figs. 1 and 2, and pushed off the belt by adjustable distributing means, such as hereinafter described.

When the same apparatus is readjusted for use in treating cantaloupes, the latter, after suitable preparation and grading, are brought to the same end of the main conveyor belt as were the lettuce heads, but by another supply conveyor or conveyors of any usual construction, and then are distributed to the respective bins by the main conveyor belt in a way similar to the way in which the lettuce heads were distributed. Since, however, one of the plant products, for example, lettuce, comes direct to the bins without preparation, while the other plant products, for example, cantaloupes, as before stated, must undergo some preparation before reaching the main conveyor, it is an important feature of the present invention that the main conveyor is arranged to be run in both longitudinal directions, as may be desired, thereby making it possible to place the receiving mechanism for the lettuce at one end of the main conveyor and means for receiving and preparing the cantaloupes at the other end of the main conveyor, and, by the proper direction of drive of the conveyor, to deliver the particular plant product then being handled, to the bin then in use.

In the best embodiment of the invention, an offal conveyor is provided below the table A, and where convenient, it may be below the level of the floor, an opening being formed in the floor to permit offal to reach the said conveyor.

These constructions are indicated in Figs. 3 and 6, respectively, in cross-section. The offal conveyor may be designated generally as E. It has the usual endless conveyor belt 42 whose upper run is supported by upper rollers 43 and whose under run is supported by lower rolls 44, the endless belt being driven by a suitable driving drum 45 at one end and passing around an idler drum 46 at the other end. The driving drum 45 may be rotated by suitable power means, such as an electric motor geared to the shaft of the drum 45.

For the sake of convenience, offal chutes are connected to the table A at intervals, on the side of the table nearest the main conveyor B. Each offal chute is trough-like, having a bottom 47, and side walls 48, wider at the upper end than at the lower end. Each offal chute has its bottom stiffened by at least one rod 49 which is bent over at the upper end, as indicated at 50, to hook on the upper edge of the removable front wall section 41 of the small bin.

Each offal chute is also aranged to be supported by the table in a manner to permit angular movement of the chute, transverse to the length of the table. In the present example, the chute is provided with a transverse bar, for example of angle iron, as indicated at 51, arranged to rest on the longitudinal stringer 16 of the table A. It will be seen that the chute may be readily removed from the table when the latter is to be extended. Also the chute when in place may be swung up against the table, the rod 49 then being erect and held so by any suitable means, as for example the catch indicated at 52, thereby leaving the space between the front posts 30 and the table legs 11 clear for entrance of the trimmers who are to work on the lettuce. When the trimmers are at their places the chutes may be swung outward at an angle so as to rest on the upper edge of the removable section 41. The width of the chutes is relatively small in comparison with the length of a table section, and there may be only one chute to each two trimmers. Thus there is plenty of space for the trimmers to work.

The offal, such as leaves and roots, removed from a head of lettuce, may be deposited in the adjacent chute by the trimmer and will slide down the chute and drop onto the upper belt of the offal conveyor E which will carry it off to a suitable place of deposit.

In the best embodiment of the invention, the offal conveyor may deliver to an inclined slat elevator which will lift the offal to discharge it at a height either into a wagon or into a storage bin having a hopper bottom with a trap door, all at such a height that a truck or car may be run beneath the bin and receive the offal therefrom when the trap door is opened. Such an arrangement is indicated generally in the drawing at F, but forms no part of the present invention.

The main conveyor B has its frame provided at the top with tracks $b$ and $b'$, on which an unloading apparatus may travel back and forth longitudinally of the said main conveyor.

In an unloading device suitable for use with the present main conveyor, positive means are provided for moving the plant product transversely from the main conveyor belt 28, instead of depending upon mere inclined sheer boards to direct them to the margin of the main conveyor belt. This is an important feature of the invention, and may be embodied in two different types of unloading device.

In the first type illustrated in Figs. 7, 8, and 9, the positive means for moving the plant product transversely of the main conveyor belt includes a transversely arranged, substantially horizontal endless belt on which the plant product is deposited by the main conveyor, whereas the second type illustrated in Figs. 12 to 16, has an endless belt arranged with its working face in an erect plane, usually about vertical, this plane extending transversely across the main conveyor at such an angle to the longitudinal axis of said main conveyor that the plant product, brought up to the unloading apparatus by the main conveyor, will come into contact with the face of the erect belt and will thereby be moved transversely across the main conveyor at an angle, and be discharged from the main conveyor into the respective bins.

In both the first and second types of unloading apparatus, means are provided for moving the entire unloading apparatus in the direction of the length of the main conveyor, in both directions of such length, that is to say, back and forth along said main conveyor, so as to automatically distribute the plant product to a plurality of bins. The apparatus is such that the rate of travel of the unloading apparatus along the main conveyor will be varied at will, and when desired such unloading apparatus may be allowed to remain stationary at any desired point of its travel, so as to continue the discharge of the plant product at any such point along the length of the main conveyor.

That type of unloading apparatus employing the horizontal discharge belt will be described first, and then the second type having the erect belt.

The first type of unloading apparatus, indicated at B', comprises a suitable frame supporting a hopper or bin B², having a bottom formed of an endless belt arranged to run in a direction transverse to the main conveyor belt and above the latter. This transverse endless belt is indicated at 53. It passes around a drive roller 54 at one end and around an idler roller 55 at the other end, and may be supported between the said two rollers if required, by intermediate supporting rolls 56, for the upper run of the belt and 57 for the lower run of said belt.

The shaft of the drive roller 54 is extended as shown at 58 and is provided with a suitable driving means. In the present example, this may comprise gearing operated by the main conveyor belt. In this case the shaft 58 carries a bevel gear 59 fixed on said shaft and arranged to mesh with a bevel gear 60, fixed on a transverse shaft 61 carried in suitable bearings in the frame of the unloading apparatus. The transverse shaft 61 is provided with a chain wheel 62 fixed to it.

The frame of the unloading apparatus has two transverse drums 63 and 64, mounted on shafts 65 and 66, respectively, which extend transversely of the main conveyor belt, one drum 64 having its lower face tangential to the normal plane of the upper face of the main conveyor belt, and the other drum 63 being mounted high enough to be well above the transverse conveyor belt 53 for a purpose which will appear hereinafter. The drum shafts 65 and 66 are journaled in suitable bearings in the frame of the unloading apparatus. The main conveyor belt 28 has its upper run passed around and over the drum 64, then under, around and over the drum 63, from which it sags down at an incline to its normal level, suitable additional supporting rollers being supplied if necessary. In practice one such roller 67 journaled in bearings in the frame of the unloading apparatus will suffice.

The drum 63 is fixed to its shaft 65, and the latter is provided with a chain wheel 68 connected by a drive chain 69 with the chain wheel 62.

By the arrangement disclosed, the main conveyor belt drives the drums 63 and 64 and the drum 63 drives the bevel gearing and rotates the shaft 58 which drives the transverse conveyor belt 53. It will be seen that with the main conveyor belt traveling in the direction from right to left in Figs. 1, 2 and 8, any heads of lettuce or like plant product deposited upon the upper run of said main conveyor belt at the right hand end will travel to the unloading apparatus B′, will be carried up the incline and be dropped into the hopper or bin and onto the upper run of the transverse belt conveyor, which moves in such a direction transversely as to discharge the product into the bin on the side of the main conveyor toward the table.

So far as described, the unloading apparatus will discharge at one point only. In order to provide for the distribution of products substantially throughout the effective length of the main conveyor, suitable means are provided for moving the unloading apparatus lengthwise back and forth in the direction of the length of the main conveyor, either to the full extent of its travel or through any shorter range of travel, as circumstances may require, to distribute the plant products as may be necessary to maintain a supply to the operatives.

The means for traveling the unloading device back and forth through any desired range of travel in the direction of the length of the main conveyor, in the present example, comprises a pair of draft cables 70 and 71, each of which has one end secured to the unloading apparatus, the draft cable 70 passing in one direction to and around a sheave 72 and back to a winding drum 73 located beneath the main conveyor, usually near the center thereof, while the other draft cable 71 passes in the opposite direction to and around a sheave 74 and then to the winding drum 73. The ends of the draft cables are wound in opposite directions on the winding drum so that as one cable is wound up, the other cable is unwound, and vice versa, according to the direction of rotation of the winding drum 73.

The winding drum may be rotated in any suitable way. In the present example the winding drum 73 is illustrated as driven by an electric motor 75 having a pulley or chain wheel 76 connected to a corresponding pulley or chain wheel 77 fixed on the shaft of the winding drum 73, the connection from one pulley or chain wheel to the other pulley or chain wheel, respectively, being by a belt or chain, indicated at 78.

The motor which drives the winding drum must be a reversible motor, so that it may be controlled to operate the winding drum in both directions of revolution, as may be desired. In usual practice the motor is an electric motor and is controlled by suitable control means involving a pole changing switch 79 to determine the direction of revolution of the motor, and a rheostat or voltage control mechanism 80 to determine speed of travel of the unloading apparatus.

The speed having been adjusted by the rheostat or voltage control device, no further change of the latter will be necessary, but the pole-changing switch 79 must be operated at each end of the travel of the unloading apparatus. In the best embodiment of the invention, this operation will be done automatically. One convenient way to accomplish the desired result is to provide at one side of the main conveyor apparatus, in the path of the unloading apparatus, a pair of electric switches 81 and 82, each of which has an arm arranged to be struck by an arm 83, or 84, at its respective end of the frame of the unloading apparatus and thus thrown to close a circuit which includes relays 85 arranged to control an electromagnetic apparatus 86 for shifting the pole-changing switch 79 to reverse the direction of rotation of the electric motor. By making the electric switches adjustable along the frame of the main conveyor, the range of movement of the unloading apparatus may be adjusted as desired.

A manually operated switch 86′ may be provided to cut off current from the main source of supply to the motor so that the latter may remain stationary. In this condition, if the main conveyor belt is still operating, the plant product will be discharged at one place only.

The main conveyor belt passes around a driving drum 87 at one end and around an idler drum 88 at the other end. A reversible motor operates the driving drum 87 so that the upper run of the main conveyor belt may be made to travel in either direction. For the purpose of controlling the direction of movement of said upper run, the motor 89 for driving it is arranged to be controlled by a pole-changing switch 90, which may be manually operated. Also a rheostate or voltage changing means 91, manually controllable, may be supplied in order that the speed of travel of the main conveyor belt may be regulated as desired.

It will be noted that the unloading device is operative to receive plant products from the main conveyor belt only when said belt is running in one direction, for example, from right to left in Fig. 1. When the belt is running in the opposite direction, the plant products will not be carried up into the unloading apparatus but will be brought toward that end of the frame of said unloading device away from the inclined belt portion, and will be stopped. By providing this end of the unloading device with a sheer board 92 set at an incline across the main conveyor belt, and by stopping the motor which operates the winding drum, any products which may be supplied by the main conveyor belt when its upper run is moving from left to right, Fig. 1, will be discharged laterally from the said belt upon reaching the stationary unloading apparatus, by means of the inclined sheer board.

In the ordinary use of the plant for handling lettuce, the main conveyor belt runs in the direction to carry the lettuce up into the bin of the unloading apparatus where the lettuce heads fall onto the transverse belt conveyor and are discharged by the latter into the small or lettuce bin D, the back and forth travel of the unloading apparatus serving to distribute the lettuce heads along the small bin so as to maintain a sufficient supply to a number of operatives working at said bin. At this time, of course, the table sections are not in their extended positions, but are what may be termed closed.

When the apparatus is working on another plant product, for example cantaloupes, the direction of travel of the main conveyor belt is reversed, and the plant product is supplied from the end opposite that from which the first plant product was supplied. For example, in the apparatus illustrated in Fig. 1, the cantaloupes will be supplied at the left and the main conveyor will travel to the right. The unloading apparatus may be adjusted along the main conveyor and allowed to remain stationary at the adjusted position, so that as the cantaloupes are brought up to said unloading device, they will strike the inclined sheer board 92 carried by it and be forced laterally into the large bin C at that time formed as hereinbefore described when the table top sections and their attached side sections are in their extended positions.

By adjusting the unloading apparatus along the main conveyor, the point of discharge of the cantaloupes may be adjusted. During this use of the unloading apparatus to carry the sheer board to discharge the cantaloupes, the main conveyor belt is still operating the drums and other machinery of the unloading apparatus. In order to avoid loss of power and wear on the unloading apparatus, it is common practice to withdraw the main conveyor belt from the drums of the unloading apparatus, shortening the belt if necessary or otherwise taking up the slack, and then traveling the unloading device to the extreme end of the main conveyor tracks, where it stands out of use. In this use of the apparatus, a removable sheer board 92$^a$ for forcing the cantaloupes transversely from the main conveyor into the large bin C may be attached adjustably to the frame of the main conveyor.

Such a sheer board is illustrated in Figs. 17 and 18. The board 92$^a$ is provided with a pintle pin 92$^b$ arranged to be inserted loosely and removably in a socket 92$^c$ carried by an anchor plate 92$^d$ secured to the main conveyor frame. A plurality of such sheer boards may be provided, two being indicated in the drawings. In such case, the anchor plate is provided with an upward projecting stop device, indicated at 92$^e$, against which the free end of the adjacent sheer board may rest, when such sheer board is swung out of use and parallel to the length of the main conveyor frame. The sheer boards may be removed at any time by lifting them up until the pintle pins are freed from their respective sockets.

The second type of unloading apparatus, shown in Figs. 12 to 16, comprises a frame 107 of suitable construction provided with rubber tired wheels 108 arranged to run on tracks $b^2$, $b^3$, carried by the main conveyor frame. The frame 107, in the example illustrated, has that end which is to face the oncoming plant products, arranged in an erect or generally vertical plane which extends transversely and is inclined at an angle to the length of the main conveyor.

A pair of vertical rotatable belt rollers 109 and 110, are mounted in upper journals 111 and 112, and lower journals 113 and 114, carried by the inclined end of the frame. Around these rollers passes an endless belt 115 which may be termed a deflection belt. The shaft of at least one of the belt rollers for example, roller 109, is arranged to be rotated in any suitable way, most advantageously by an electric motor 116 carried by the frame, which motor drives the said belt roller 109 through a suitable driving connection such as a pair of sprocket wheels 117 and 118, one fixed to the upper end of the shaft of roller 109 and the other driven by the motor shaft, these sprocket wheels being connected by a sprocket chain 119. Suitable means are provided for stopping, starting and controlling the electric motor, indicated generally as a switch box 120 located at any desired place.

In addition to the wheels 108, which support the frame on tracks carried by the main conveyor frame, the unloader frame also carries suitable means for preventing its lateral displacement relative to the main conveyor frame. In the present embodiment of the invention, this said means comprises four alignment or guide rollers 121 and 122, arranged in pairs on substantially vertical axes carried by the frame, and arranged to run on opposite lateral sides of a vertical web of a guide rail 123 carried by the main conveyor frame, which may be a part of the track $b^2$.

In the best embodiment of the invention the axes of the guide rollers 121 and 122 are journaled in bars 125 which are secured to the unloader frame so as to permit their adjustment toward and from the guide rail, as for example by slots in the bars through which the securing bolts pass.

Any suitable means for conveying electric current to the motor 116 may be provided, such as a pair of conductor rails and shoes, overhead trolleys and fixed conductors, or most advantageously, a trailing electric cable, indicated at 126 which may drape itself on the floor at that side of the conveyor remote from the bins, and connect the motor to the switch box 120.

At the inclined end of the frame, close to its bottom edge, there is mounted a curved inclined deflector shoe 127, whose lower edge runs in close approximation to the upper surface of the main conveyor belt, and is so sloped in the direction of the length of the main conveyor as to scoop up the on-coming plant product and raise it into contact with the outer face of the deflector belt, which, being at a sufficient angle transversely of the length of the main conveyor, will readily force such plant product laterally and discharge it from the main conveyor to the respective bins. The deflector shoe 127 is parallel to the deflector belt and extends upward somewhat above the lower edge of the deflector belt. It may be adjustably mounted on the unloader frame, as by slots and bolts extending therethrough into the frame, to permit an accurate and close adjustment of the forward operative edge of the deflector shoe 127 toward and nearly into contact with the upper surface of the main conveyor belt, to prevent as much as possible the entrance of any part of the plant product, for example, lettuce leaves, beneath the shoe.

The frame 107 of the unloading device is arranged to be hauled back and forth on its tracks by cables and a motor-driven winding drum, such as has already been described hereinbefore in connection with the first type of unloading device.

In this construction the ends of the two cables are indicated at 128 and 129, being attached to eyes 130 and 131 carried by the frame of the unloading device. Since these are at one side of the main conveyor frame, the cables must be led around suitable sheaves or pulleys 132 and 133 at the ends of the conveyor frame, and thence to the winding drum, when used to discharge one type of plant product.

In the best embodiment of the invention the frame of the unloading device may be provided with a sheer board 134, attached at a suitable angle and serving to deflect plant products coming from the opposite direction, as will be clear from the drawings.

Suitable means is provided for depositing plant products, such as lettuce on the upper run of the main conveyor belt, at one end and another means for depositing a different plant product such as cantaloupes on the upper run of said belt at its other end. In the present example illustrated in the drawings, it is assumed that lettuce is placed on the main conveyor belt at the right hand end, Figs. 1 and 2 and cantaloupes at the left hand end. While the mechanism for supplying lettuce or the like to the belt may be variously constructed, the following has been found most satisfactory, reference being made to Figs. 19 and 20 of the drawings.

Lettuce is brought to the packing house usually in four-wheeled trailers which have bodies which can be opened at one side and tilted sideways to dump their contents into the foot or boot of one or the other of two elevating devices, which deliver the lettuce on the upper run of the main conveyor belt. In the present apparatus each elevating device comprises three continuous slat type elevators, indicated at G, H and I respectively, Fig. 19, G receiving the lettuce as it is discharged from the vehicles, and discharging it onto the next elevator H which elevates it and discharges it onto the third elevator I which in turn elevates it and discharges onto the upper run of the main conveyor belt.

The elevator H is arranged to run at a much higher lineal speed than elevator G, usually twice as fast, and elevator I is run at a higher lineal speed than elevator H, also usually twice as fast. This serves to distribute the lettuce in a single thin layer rather uniformly scattered on the main conveyor belt, notwithstanding the fact that when a vehicle is unloaded by dumping its contents onto the foot of elevator G, the latter receives and carries the lettuce in piles several layers deep.

The elevators G, H and I are operated by an electric motor through suitable drive mechanism, including belts and sets of pulleys connecting in series the upper driving shafts g, h and i respectively of the three conveyors, as shown in Fig. 19, the dimensions of the respective pulleys being such as to give the differences in lineal speed of the slat elevators hereinbefore referred to. Not only do the elevators serve to spread out the lettuce heads in a thin layer on the main conveyor belt, but also to a considerable extent shake out dirt which may still be on the heads of lettuce as delivered from the field.

As will be clear from the description hereinbefore, the lettuce heads delivered on the end of the main conveyor belt conveyor are carried to the unloading apparatus, then up the incline into it, and then, by means of the transverse belt conveyor 53 of the unloading apparatus, are distributed and delivered to the small bin, D, the table sections being then in their non-extended or closed position ready to serve as work tables to receive trimmed lettuce placed there by the trimmers and removed from said tables and packed in crates by the packers. By the continuous travel of the unloading apparatus back and forth along the length of the main conveyor, the small bin D is kept well supplied throughout its length even in a relatively large packing house.

It will be noted that the main conveyor mechanism in conjunction with the unloading apparatus comprises a conveying and discharging apparatus particularly suitable for conveying and discharging articles which must not be too roughly handled, such as lettuce, cabbage, cauliflower or the like.

When cantaloupes are to be packed, the direction of travel of the upper run of the main conveyor belt is reversed so that the cantaloupes may be supplied to that end of the belt opposite the end which received the lettuce and will be carried in the proper direction for distribution to the large bin, C, which is formed by extending the table sections and inserting the bottom panels c, as hereinbefore explained.

It is customary to put the cantaloupes through a sorting treatment involving the use of a sorting table at which operatives may work to sort out defective melons, and send the selected ones forward for packing. Also it is generally customary to subject the melons to treatment with a wax emulsion and then to drying before delivery to the main conveyor belt.

In the drawings, Figs. 1 and 2, there is illustrated, diagrammatically, apparatus suitable for receiving the cantaloupes from vehicles, delivering them to a sorting table, conveying them as rapidly as sorted to apparatus for applying a wax emulsion, then carrying them through a drier, and finally depositing them on the proper end of the main conveyor belt.

This apparatus comprises an inclined floor 95, onto which the cantaloupes are discharged from side dumping four-wheeled trailers such as were used for hauling lettuce. The cantaloupes roll down the floor onto an endless belt conveyor indicated at 96, which conveys them to an inclined elevator 97, which discharges in two directions, onto two sorting tables 98, 99, each having its top made of a series of rollers mounted in journals in a frame, so as to be easily rotated so that the fruit forwarded by the elevator 97 will offer no obstruction to the oncoming fruit. In order to deliver the fruit from the elevator 97 to the two tables 98 and 99 a V-shaped partition or divider board 100 is located between the entrance ends of the tables, the edge of the V facing the elevator.

Between the two tables there is a cull conveyor 101 arranged to carry away the culls discarded by the sorters who work at the two tables.

As the sorters select the good cantaloupes they push them along to a wide conveyor belt 102, suitably driven which conveys the selected cantaloupes to apparatus for applying wax emulsion, to the individual cantaloupe. This apparatus indicated generally at 103 is old and well known and therefore need not be described in detail. It has means for forwarding the cantaloupe while coating it and delivers the cantaloupe to a conveyor 104, that transports it to one end of a continuous drier, 105, also old and well known, which after drying the wax coating in the usual way delivers the prepared cantaloupe, in proper condition for packing to an elevator 106 which in turn delivers it to the proper end of the upper run of the main conveyor belt 28.

This now carries the cantaloupe toward the sheer board, either that, 92, carried by the unloading apparatus, as heretofore explained or that, 92ª, set at the desired place, adjusted from time to time, along the main conveyor frame, the sheer board forcing the cantaloupe laterally from the main conveyor belt into the large bin C for cantaloupe. As the bottom c of this large bin is inclined toward the packers' work place, they are kept supplied throughout the length of the large bin, the distribution to the individual packers being controlled by the adjustment of the sheer board.

The packers pack the cantaloupes in crates, and place the crates on a conveyor which carries them to the nailing machine.

The said crate conveyor, which also serves for crates of lettuce, is indicated at K and the nailing machine at L. As these form no part of the invention they are not described in detail and the drawings merely indicate their general locations diagrammatically to show their relation to the remainder of the apparatus.

It will be seen that while the means for supplying lettuce, for example, to one end of the main conveyor belt is in use, the means for supplying cantaloupes to the other end of the said belt is idle and vice versa. Practically all the remainder of the apparatus, however, performs a conjoint function since it is capable of use in packing both types of plant product. As a result, the investment in apparatus is greatly decreased as compared with prior apparatus, the cost of removing and replacing apparatus is avoided, and only one of the two means for supplying plant products to the main conveyor belt is idle at one time. Hence the expense of handling the respective products is very materially reduced.

Certain subject matter herein disclosed and originally covered by claims that have since been divided out pursuant to final requirement for division is the subject matter of a co-pending divisional application, Ser. No. 465,851, filed November 17, 1942.

What is claimed is:

1. In an apparatus for use in preparing, grading and packing for market a plurality of kinds of plant products, such as lettuce and cantaloupes, a table having its top and at least part of one side portion arranged to be moved into an extended inclined position to form a support for a bin floor, a conveyor mechanism arranged to transport plant products in a direction parallel to the length of said table, at a distance therefrom sufficient to allow the bin floor carried by the extended inclined table top and side portion to reach substantially to but below the operative level of said conveyor, another bin adjacent to and below the conveyor on the side toward the table and having a front wall spaced from the table to furnish a working space for operatives, said front wall serving as a support for the extended table top and side portion, means for moving the conveyor longitudinally, means for supplying the conveyor with plant products, and means located above the conveyor for discharging plant products from the conveyor at its side nearest the table.

2. In an apparatus for use in preparing, grading and packing for market a plurality of kinds of plant products, such as lettuce and cantaloupes, a table having its top and at least part of one side portion arranged to be moved into an extended inclined position to form a support for a bin floor, a conveyor mechanism arranged to transport plant products in a direction parallel to the length of said table, said conveyor mechanism having a frame and being located at a distance from the table sufficient to allow the bin floor carried by the extended inclined table top and side portion to reach substantially to but below the operative level of said conveyor, and to be supported at one end by said conveyor frame, another bin adjacent to and below the conveyor on the side toward the table and having a front wall spaced from the table to furnish a working space for operatives, said front wall serving as a support for the extended table top and side portion, means for moving the conveyor longitudinally, means for supplying the conveyor plant products, and means located above the conveyor for discharging plant products from the conveyor at its side nearest the table.

3. In an apparatus for use in preparing, grading, and packing for market a plurality of kinds of plant products, such as lettuce and cantaloupes, a table having its top and at least part of one side portion arranged to be moved into an extended inclined position to form a support for a bin floor, a conveyor mechanism arranged to transport plant products in a direction parallel to the length of said table, at a distance therefrom sufficient to allow the bin floor carried by the extended inclined table top and side portion to reach substantially to but below the operative level of said conveyor, another bin adjacent to and below the conveyor on the side toward the table and having a front wall spaced from the table to furnish a working space for operatives, said front wall serving as a support for the extended table top and side portion, means for moving the conveyor in each direction longitudinally, means for supplying the conveyor at one end with one type of plant product when the conveyor is moving in one direction, means for supplying said conveyor at its other end with another type of plant product when the conveyor is moving in the opposite direction, and means located above the conveyor for discharging the corresponding plant product from the conveyor at the side toward the table.

4. In an apparatus for use in preparing, grading, and packing for market a plurality of kinds of plant products, such as lettuce and cantaloupes, a table having its top and at least part of one side portion arranged to be moved into an extended inclined postion to form a support for a bin floor, said table having a closed wall portion arranged to form the front wall for the said bin, a conveyor mechanism arranged to transport plant products in a direction parallel to the length of said table, at a distance therefrom sufficient to allow the bin floor when on the extended inclined table top and side portion to reach substantially to but below the operative level of said conveyor, another bin adjacent to and below the conveyor on the side toward the table and having a front wall spaced from the table to furnish a working space for operatives, said front wall serving as a support for the extended table top and side portion, means for moving the conveyor in each direction longitudinally, means for supplying the conveyor at one end with one type of plant product when the conveyor is moving in one direction, means for supplying said conveyor at its other end with another type of plant product when the conveyor is moving in the opposite direction, and means located above the conveyor for discharging the corresponding plant product from the conveyor at the side toward the table.

5. In an apparatus for preparing, grading and packaging for market a plurality of plant products, the combination with a main belt conveyor mechanism including a frame, a bin located along one side of the frame, and having a front wall, a convertible table arranged parallel to the conveyor at a distance from the front of the bin sufficient to give a space for operatives to stand, said table having a top and at least a portion of its side nearest the conveyor arranged to be moved into an extended inclined position reaching across the front wall of said bin, said extended top and side portion being supported by the front wall of the said bin, a panel forming the bottom of a larger bin supported at an incline by the extended top and side portion and by the frame of the conveyor, means for moving the conveyor in each direction longitudinally, means for supplying the conveyor at one end with one type of plant product when the conveyor is moving in one direction, means for supplying the conveyor at the opposite end with another type of plant product when the conveyor is moving in the opposite direction, and means located above the conveyor for discharging the corresponding plant product from the conveyor at the side toward the table.

6. In an apparatus for use in preparing, grading, and packing for market a plurality of kinds of plant products, such as lettuce and cantaloupes, a table having its top and at least part of one side portion arranged to be moved into an extended inclined position to form a support for a bin floor, a conveyor mechanism arranged to transport plant products in a direction parallel to the length of said table, at a distance therefrom sufficient to allow the extended inclined table top and side portion to reach substantially to but below the operative level of said conveyor, another bin adjacent to and below the conveyor on the side toward the table and having a front wall spaced from the table to furnish a working space for operatives, said front wall comprising a fixed lower part and a movable upper part, the lower part serving as a support for the extended table top and side portion, means for moving the conveyor in each direction longitudinally, means for supplying the conveyor at one end with one type of plant product when the conveyor is moving in one direction, means for supplying said conveyor at its other end with another type of plant product when the conveyor is moving in the opposite direction, and means located above the conveyor for discharging the corresponding plant product from the conveyor at the side toward the table.

7. In an apparatus for use in preparing, grading and packing for market a plurality of kinds of plant products, such as lettuce and cantaloupes, a table having its top and at least one part of one side portion connected and arranged to be swung jointly into an extended inclined position to form a support for a bin floor, an offal conveyor below the table, a removable offal chute supported at one end by the table and arranged to lead offal from the outside of the table to the offal conveyor beneath the table, a traveling conveyor mechanism arranged substantially parallel to the length of said table at a distance therefrom sufficient to allow the extended inclined table top and side portion to reach substantially to but below said conveyor, a bin adjacent and below the conveyor on the side toward the table and having a two part wall, the lower part being arranged to support the extended end of the table top and connected side portion when the latter are in their extended positions, the upper part being arranged to support the outer end of said offal chute, when the table top and its side portion are not extended, said front wall of the bin being spaced from the table to furnish a working space for operatives, means for driving the traveling conveyor longitudinally, means for supplying said traveling conveyor with plant products and means located above the traveling conveyor for discharging the plant products from the traveling conveyor at its side nearest the said table.

8. In an apparatus for use in preparing, grading, and packing for market a plurality of kinds of plant products, such as lettuce and cantaloupes, a table having its top and at least one part of one side portion connected and arranged to be swung jointly into an extended inclined position to form a support for a bin floor, an offal conveyor below the table, a removable offal chute supported at one end by the table and arranged to lead offal from the outside of the table to the offal conveyor beneath the table, a traveling conveyor mechanism arranged substantially parallel to the length of said table at a distance therefrom sufficient to allow the extended inclined table top and side portion to reach substantially to but below said conveyor, a bin adjacent and below the conveyor on the side toward the table and having a two part wall, the lower part being arranged to support the extended end of the table top and connected side portion when the latter are in their extended positions, the upper part being arranged to support the outer end of said offal chute, when the table top and its side portion are not extended, said front wall of the bin being spaced from the table to furnish a working space for operatives, means for driving the traveling conveyor continuously in each longitudinal direction, means for supplying said traveling conveyor at one end with one type of plant product when the conveyor is running in one direction, means for supplying said traveling conveyor at its other end with another type of plant product when the conveyor is running in the opposite direction, and interchangeable means located above the traveling conveyor for discharging the corresponding plant products from the traveling conveyor at the side toward the said table.

9. In an apparatus for use in preparing, grading, and packaging a plurality of plant products for market, a main belt conveyor having a frame, a bin extending alongside said frame below the level of the top of the conveyor, said bin having a front wall, a table spaced from said front wall sufficiently to provide a working space for operatives, said table having a side portion arranged to be swung at an angle toward the main belt conveyor, and also having a top section joined to said side portion whereby the top section and conjoined side portion may be swung into an extended inclined position to extend over the front wall of said bin, said front wall of the bin serving to support the top section and conjoined side portion when in their extended position, a brace supported by the table and arranged to support the top section and side portion near their line of connection, an inclined cross member secured to the table in alinement with the extended top section and side portion, and a removable panel arranged to rest on the extended top section, side portion and cross-member and to extend to and be supported by the conveyor frame, to form a large bin bottom sloping downward toward the table.

HARRY CLINTON BREST.